(12) United States Patent
Lagorgette et al.

(10) Patent No.: US 11,139,757 B2
(45) Date of Patent: Oct. 5, 2021

(54) ROTATING PIEZOELECTRIC MOTOR WITH AXIAL PRELOAD

(71) Applicant: ETA SA Manufacture Horlogere Suisse, Grenchen (CH)

(72) Inventors: Pascal Lagorgette, Bienne (CH); Pascal Meyer, Neuchatel (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 398 days.

(21) Appl. No.: 16/271,903

(22) Filed: Feb. 11, 2019

(65) Prior Publication Data

US 2019/0280623 A1    Sep. 12, 2019

(30) Foreign Application Priority Data

Mar. 9, 2018   (EP) ..................................... 18160978

(51) Int. Cl.
  *H02N 2/10*  (2006.01)
  *G04C 3/12*  (2006.01)
  *H02N 2/00*  (2006.01)

(52) U.S. Cl.
  CPC .............. *H02N 2/103* (2013.01); *G04C 3/12* (2013.01); *H02N 2/001* (2013.01); *H02N 2/006* (2013.01); *H02N 2/0055* (2013.01)

(58) Field of Classification Search
  CPC ...... H02N 2/103; H02N 2/0055; H02N 2/006; H02N 2/001; H02N 2/10; H02N 2/12; G04C 3/12
  See application file for complete search history.

(56) References Cited

U.S. PATENT DOCUMENTS

2003/0052575 A1*  3/2003  Mock ..................... H02N 2/026
                                              310/328
2007/0164635 A1   7/2007  Witteveen et al.

FOREIGN PATENT DOCUMENTS

CN   101707444   5/2010
CN   105406760   3/2016

OTHER PUBLICATIONS

European Search Report dated Sep. 12, 2018 in European Application 18160978.5 filed on Mar. 9, 2018 (with English Translation of Category of Cited Documents).
Chinese Office Action dated Dec. 8, 2020 in Chinese Patent Application No. 201910175082.6, 4 pages.

* cited by examiner

*Primary Examiner* — Emily P Pham
(74) *Attorney, Agent, or Firm* — Oblon, McClelland, Maier & Neustadt, L.L.P.

(57) ABSTRACT

A rotating piezoelectric motor including a piezoelectric actuator including a resonator having a pair of arms connected at one of their ends in a connection area, the other two ends being free, a passive element including a cylindrical part extending substantially orthogonally to the resonator and passing between the free ends of the arms, the cylindrical part being rotatable by friction of the free ends, the passive element including: a lower and upper truncated cones, the small bases of the cones being arranged facing each other and on either side of the resonator, the cylindrical part of the passive element at least partly axially traversing the cones, the upper truncated cone being movable along the cylindrical part, and at least one of the cones being integral in rotation with the cylindrical part, a device for holding the lateral surfaces of the cones in contact with each of the free ends of the arms of the resonator.

11 Claims, 1 Drawing Sheet

ROTATING PIEZOELECTRIC MOTOR WITH AXIAL PRELOAD

CROSS-REFERENCE TO RELATED APPLICATION

This application claims priority to European Patent Application No. 18160978.5 filed on Mar. 9, 2018, the entire disclosure of which is hereby incorporated herein by reference.

FIELD OF THE INVENTION

The invention relates to the technical field of rotating piezoelectric motors.

BACKGROUND OF THE INVENTION

A rotating piezoelectric motor conventionally has a passive element and an actuator for rotating the passive element using the piezoelectric effect. Referring to FIG. 1, there are known, in particular, rotating piezoelectric motors 10 in which the passive element 20 is a cylinder and the piezoelectric actuator comprises a resonator 30 having a pair of arms 31, 32 connected to each other in a substantially tuning fork-shaped or U-shaped connection area 33. The piezoelectric actuator further includes two piezoelectric elements (not represented), each attached to one of arms 31, 32, and acting as excitation means for the arms to impart vibrations thereto. Passive element 20 passes between resonator arms 31, 32. More specifically, one area of the lateral surface of passive element 20 is in contact, on both sides, with the free ends 310, 320 of arms 31, 32, so that passive element 20 is rotated by the friction of free ends 310, 320 of arms 31, 32 on the contact area.

A motor of this type must be preloaded at the interface between the resonator and the passive element, in order to set the holding torque without powering the motor, i.e. without exciting the arms.

SUMMARY OF THE INVENTION

It is an object of the present invention to propose a rotating piezoelectric motor fitted with a preload system.

To this end, the invention relates to a rotating piezoelectric including:
- a piezoelectric actuator comprising a resonator having a pair of arms connected at one of their ends in a connection area, the other two ends being referred to as 'free',
- a passive element including a cylindrical part extending substantially orthogonally to the resonator and passing between the free ends of the arms.

According to the invention, the passive element further includes:
- a lower truncated cone and an upper truncated cone, the small bases of the lower truncated cone and of the upper truncated cone being arranged facing each other and on either side of the resonator, the cylindrical part of the passive element at least partly axially traversing the lower truncated cone and the upper truncated cone, the upper truncated cone being movable along one portion of the cylindrical part, and at least one of the truncated cones being integral in rotation with the cylindrical part,
- a device for holding the lateral surfaces of the lower and upper truncated cones in contact with each of the free ends of the resonator arms.

Thus, axial preloading is created between the piezoelectric actuator and the passive element: a first axial force is exerted by the upper truncated cone on the free ends of the arms, a second axial force is exerted by the lower truncated cone on the free ends of the arms, the first force and the second force being in opposite directions. The term 'axial' refers to the axis of the cylindrical part, which is also the axis of the lower truncated cone and the axis of the upper truncated cone.

The preload system thus includes the truncated cones and the holding device. It is noted that one advantage of the invention is that the preload system is self-supporting.

Given that at least one of the truncated cones is integral in rotation with the cylindrical part and that said truncated cone is in contact with the free ends of the two resonator arms, the arms are able to rotate the cylindrical part. Advantageously, both truncated cones are integral in rotation with the cylindrical part so that all the torque is transmitted to the cylindrical part.

Advantageously, the preload is balanced so that the magnitudes of the first and second forces are equal. Thus, there is no axial force on the piezoelectric motor: such a force could deform the resonator and interrupt the operation of the motor.

In a first embodiment, the holding device is able to generate an elastic force on the upper truncated cone. For example, the holding device includes a stop fixed to the cylindrical part, and an elastic element, for example a spring, a strip or a rubber element, bearing, on one hand, on the stop and on the other hand, on the large base of the upper truncated cone.

In a second embodiment, the holding device is able to generate a magnetic force on the upper truncated cone. For example, the holding device includes a magnet fixed to the large base of the lower truncated cone, and the upper truncated cone includes a magnetic material, for example a ferromagnetic material, so as to create a force of attraction between the upper truncated cone and the magnet.

The two aforementioned embodiments are examples of generation of the first axial force. According to a first variant, the lower truncated cone is placed on its large base on a support or on an element or a set of elements placed on the support. The second axial force is then the force applied in reaction to the thrust of the free ends of the arms on the lower truncated cone, said thrust being caused by the first axial force. According to a second variant, the holding device further includes a second stop fixed to the cylindrical part, and a second elastic element bearing, on the one hand, on the second stop and on the other hand, on the large base of the lower truncated cone, or the holding device further includes a second magnet fixed to the large base of the upper truncated cone, and the lower truncated cone includes a magnetic material, for example a ferromagnetic material, so as to create a force of attraction between the lower truncated cone and the second magnet.

In one embodiment, the cylindrical part includes at least one groove and each of the lower and upper truncated cones include at least one tongue capable of sliding in the groove, so that the lower truncated cone and the upper truncated cone are movable inside the groove along the axis of the cylindrical part but integral in rotation with the cylindrical part.

The invention also relates to a timepiece including a piezoelectric motor as detailed above.

In a non-limiting embodiment, the timepiece includes a hand fixed to one end of the cylindrical part.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
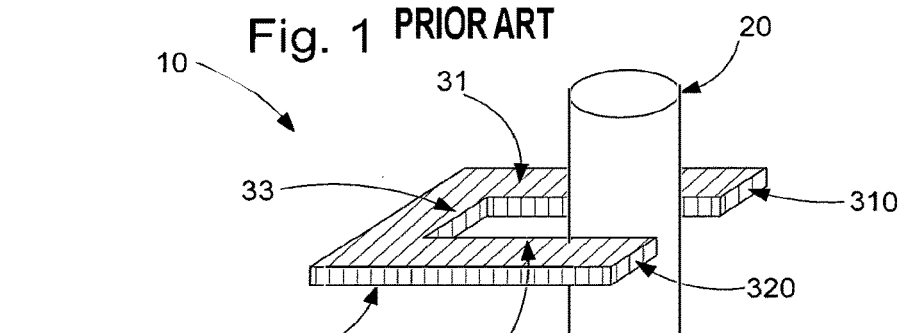
FIG. 1, already described, schematically represents a part of a rotating piezoelectric motor according to the prior art, seen from above.
Figure 2:
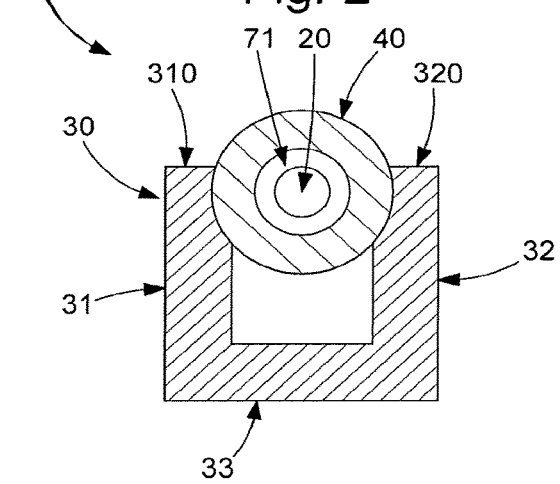
FIG. 2 schematically represents a part of a rotating piezoelectric motor according to a first embodiment of the invention, seen from above, FIG. 3 schematically represents an axial sectional view of the part of rotating piezoelectric motor of FIG. 2.
Figure 3:
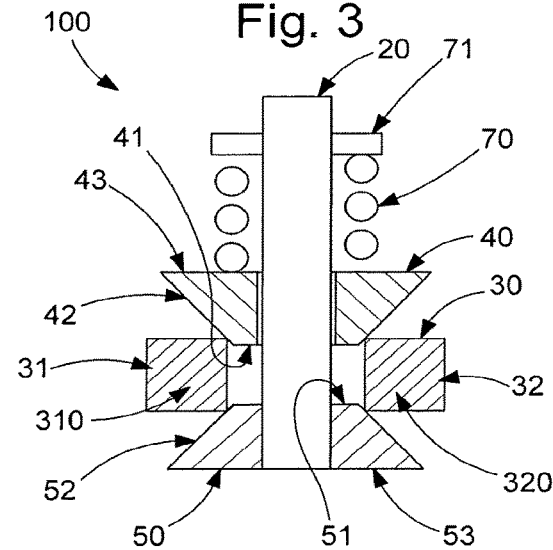
Figure 4:
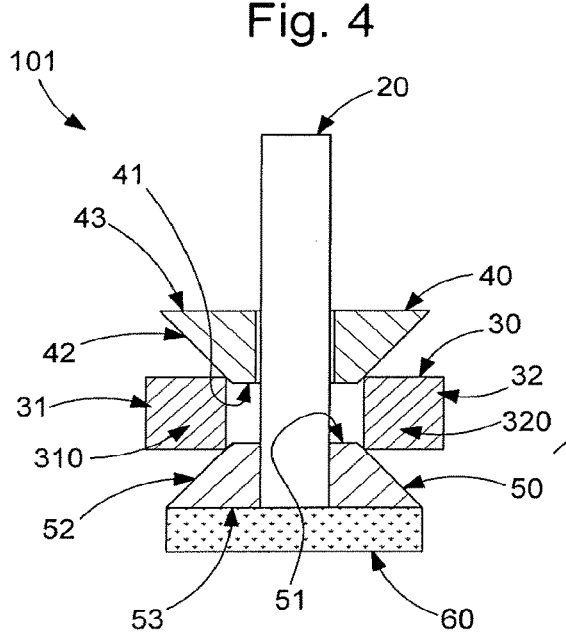
FIG. 4 schematically represents an axial sectional view of a part of a rotating piezoelectric motor according to a second embodiment of the invention, FIG. 5 schematically represents part of a timepiece including the part of the rotating piezoelectric motor of FIG. 2 and a hand fixed to said motor.

FIGS. 2 and 3 show a part of a piezoelectric motor 100 according to a first embodiment of the invention, and FIG. 4 shows a piezoelectric motor 101 according to a second embodiment of the invention. In both cases, motor 100, 101 includes a passive element including a cylindrical part 20, and a piezoelectric actuator for rotating cylindrical part 20 using the piezoelectric effect.

The piezoelectric actuator includes piezoelectric excitation means (not represented) and a resonator 30 including two arms 3, 32 able to oscillate. The excitation means are advantageously formed of two parts, each attached to a different arm. However, other embodiments of the excitation means are possible; they may, for example, be formed of a single part arranged at a joint between the arms. When a suitable voltage is applied to the excitation means, the excitation means deform, and mechanical stresses are transmitted to arms 31, 32, which then start to oscillate. If the excitation means are designed and mounted in a suitable manner on the arms, multi-dimensional oscillations of the desired form can be achieved.

Arms 31, 32 are connected in a connection area 33, and extend substantially parallel to each other from said connection area 33. The resonator is therefore generally tuning fork-shaped, i.e. U-shaped. However, this shape is not limiting. The ends of the arms that are not connected to connection area 33, are referred to as free ends 310, 320. The amplitude of the oscillations of arms 31, 32 is maximum at these ends 310, 320.

Cylindrical part 20 extends substantially orthogonally to resonator 30, i.e. orthogonally to the plane containing the axes of arms 31, 32 of resonator 30, and passes between the two free ends 310, 320.

The passive element further includes two truncated cones, referred to as upper truncated cone 40 and lower truncated cone 50, which are coaxial with cylindrical part 20. In the preferred embodiment, these two truncated cones 40, 50 are movable in translation along portions of cylindrical part 20, and integral in rotation with cylindrical part 20. However, just upper truncated cone 40 could be movable in translation along one portion of cylindrical part 20, and just one of the two truncated cones 40, 50 could be integral in rotation with cylindrical part 20. The small bases 41, 51 of the two truncated cones 40, 50 are opposite each other.

In the two non-limiting illustrated embodiments, cylindrical part 20 extends vertically (in a terrestrial reference frame), and lower truncated cone 50 is positioned at the lower end of cylindrical part 20 (either under the effect of gravity if it is movable in translation, or because it has been secured).

The free ends 310, 320 of arms 31, 32 of resonator 30 are sandwiched between the two truncated cones 40, 50. More specifically, each of free ends 310, 320 is in contact with the lateral surfaces 42, 52 of the two truncated cones 40, 50.

Since at least one of truncated cones 40 50 is integral in rotation with cylindrical part 20, the multi-dimensional oscillations of free ends 310, 320 of arms 31, 32 make it possible to impart a rotation to cylindrical part 20 about its axis by the friction of said ends 310, 320 against said at least one truncated cone 40, 50.

In addition to its weight, a second radial force is applied to upper truncated cone 40 via a holding device of to the passive element. These two forces allow lateral surfaces 42, 52 of the two truncated cones 40, 50 to rest radially on the free ends 310, 320 of arms 31, 32, forcing said free ends 310, 320 to move away from each other thereby creating pre-loading between resonator 30 and the passive element.

In the first embodiment, said holding device includes an elastic element, a spring 70 here, and a stop 71. Stop 71 is integral with cylindrical part 20, and spring 70 is such that it rests on one side on large base 43 of upper truncated cone 40 and on the other side on stop 71, so that it pushes upper truncated cone 40 towards lower truncated cone 50.

In the second embodiment, the holding device includes a magnet 60 placed on the side of lower truncated cone 50 and upper truncated cone 40 includes a magnetic material so as to attract upper truncated cone 40 towards magnet 60 and consequently towards lower truncated cone 50. Magnet 60 is, for example, attached to large base 53 of lower truncated cone 50. Magnet 60 could alternatively be attached to small base 51 of lower truncated cone 50. Further, instead of including a magnetic material, another magnet arranged to be attracted by magnet 60 could be attached to upper truncated cone 40, especially to small base 41 of upper truncated cone 40.

It is noted that at least in the embodiments in which the axis of cylindrical part 20 is not arranged vertically and lower truncated cone 50 is movable in translation along a portion of cylindrical part 20, a second holding device is required to keep lower truncated cone 50 pressed against free ends 310, 320 of arms 31, 32 of resonator 30.

In one embodiment, said second holding device includes a second elastic element (a spring, a strip or a rubber element) and a second stop. The second stop is integral with cylindrical part 20, and the second elastic element is such that it presses, on one side, on large base 53 of lower truncated cone 50 and on the other side, on the second stop so that it pushes lower truncated cone 50 towards upper truncated cone 40. In another embodiment, the second holding device includes a magnet, referred to as the second magnet, placed on the side of upper truncated cone 40 and lower truncated cone 50 includes a magnetic material so as to attract lower truncated cone 50 towards the second magnet and consequently towards upper truncated cone 40. The second magnet is, for example, attached to large base 43 of upper truncated cone 40. The second magnet could alternatively be attached to small base 41 of upper truncated cone 40. Further, instead of including a magnetic material, another magnet arranged to be attracted by the second magnet could be attached to lower truncated cone 50, in particular to small base 51 of lower truncated cone 50.

Figure 5:
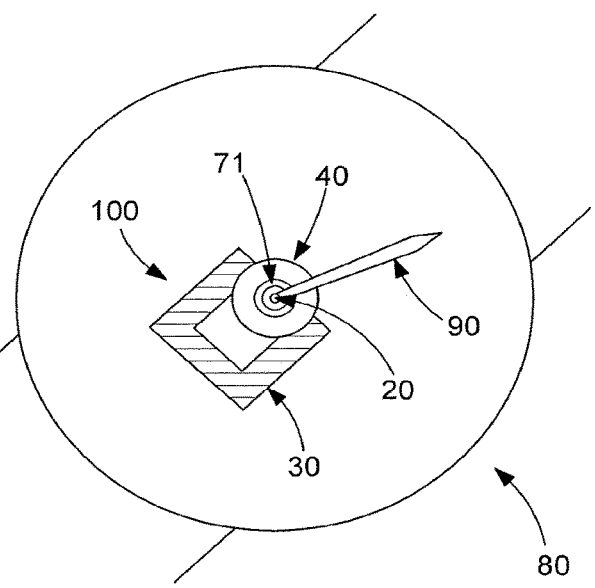

Finally, FIG. 5 shows a timepiece 80 of the wristwatch type, including a hand 90 fixed to the upper end of cylindrical part 20 of piezoelectric motor 100 according to the first embodiment. However, the piezoelectric motor according to one of the embodiments of the invention could be used to drive in rotation not a hand, but a disc (for example a date disc or a moon phase disc), a wheel or a ring.

It will be clear that various modifications and/or improvements and/or combinations evident to those skilled in the art may be made to the various embodiments of the invention set out above without departing from the scope of the invention defined by the annexed claims.

The invention claimed is:

1. A rotating piezoelectric motor comprising:
   a piezoelectric actuator comprising a resonator having a pair of arms connected at one of their ends in a connection area, the other two ends being referred to as 'free',
   a passive element comprising a cylindrical part extending substantially orthogonally to the resonator and passing between the two free ends of the pair of arms, the cylindrical part being able to be rotated by a friction of the two free ends on the passive element,
   the passive element further comprising:
      a lower truncated cone and an upper truncated cone, small bases of the lower truncated cone and of the upper truncated cone being arranged facing each other and on either side of the resonator, the cylindrical part of the passive element at least partly axially traversing the lower truncated cone and the upper truncated cone, the upper truncated cone being movable along one portion of the cylindrical part, and at least one of the upper and lower truncated cones being integral in rotation with the cylindrical part,
      a holding device for holding lateral surfaces of the lower and upper truncated cones in contact with each of the two free ends of the pair of arms of the resonator.

2. The rotating piezoelectric motor according to claim 1, wherein the upper and lower truncated cones are integral in rotation with the cylindrical part.

3. The rotating piezoelectric motor according to claim 1, wherein the holding device is able to generate an elastic force on the upper truncated cone.

4. The rotating piezoelectric motor according to claim 3, wherein the holding device comprises a stop fixed to the cylindrical part, and an elastic element bearing, on the one hand, on the stop and on the other hand, on a large base of the upper truncated cone.

5. The rotating piezoelectric motor according to claim 1, wherein the holding device is able to generate a magnetic force on the upper truncated cone.

6. The rotating piezoelectric motor according to claim 5, wherein the holding device comprises a magnet fixed to a large base of the lower truncated cone, and the upper truncated cone comprises a magnetic material, so as to create a force of attraction between the upper truncated cone and the magnet.

7. The rotating piezoelectric motor according to claim 3, wherein the holding device comprises a second stop fixed to the cylindrical part, and a second elastic element bearing, on the one hand, on the second stop and on the other hand, on a large base of the lower truncated cone.

8. The rotating piezoelectric motor according to claim 3, wherein the holding device comprises a second magnet fixed to a large base of the upper truncated cone, the lower truncated cone comprising a magnetic material so as to create a force of attraction between the lower truncated cone and the second magnet.

9. The rotating piezoelectric motor according to claim 2, wherein the cylindrical part comprises at least one groove and each of the lower and upper truncated cones comprises at least one tongue capable of sliding inside the at least one groove.

10. A timepiece comprising the rotating piezoelectric motor according to claim 1.

11. The timepiece according to claim 10, comprising a hand fixed to one end of the cylindrical part.

* * * * *